UNITED STATES PATENT OFFICE.

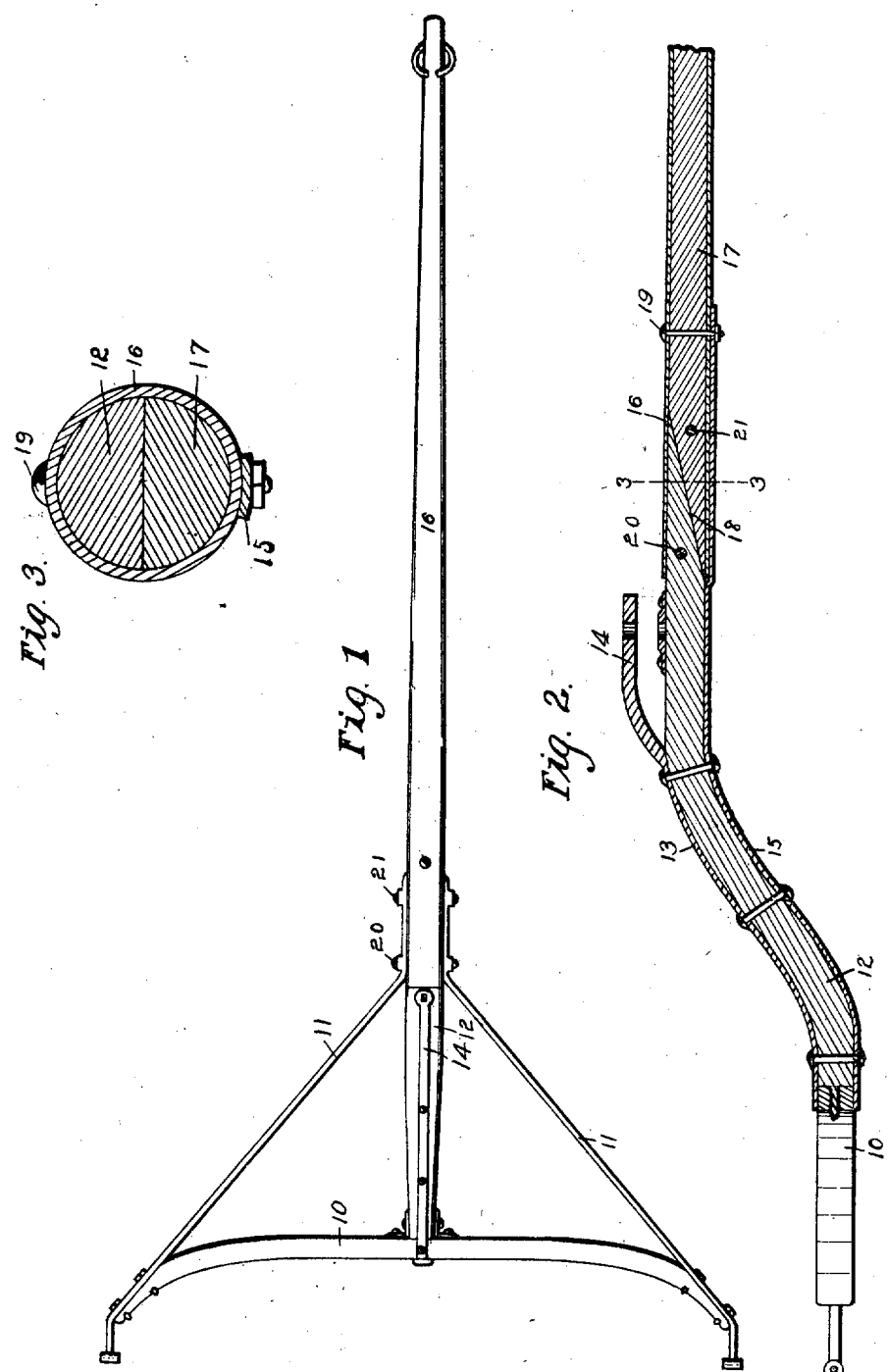

CHARLES W. NEEDLES, OF ATLANTIC, IOWA.

VEHICLE-POLE.

No. 890,167.

Specification of Letters Patent.

Patented June 9, 1908.

Application filed August 31, 1907. Serial No. 390,926.

*To all whom it may concern:*

Be it known that I, CHARLES W. NEEDLES, a citizen of the United States, residing at Atlantic, in the county of Cass and State of Iowa, have invented a certain new and useful Vehicle-Pole, of which the following is a specification.

My invention relates to that class of vehicle poles in which the rear portion of the pole proper is curved downwardly and rearwardly, and the entire pole is formed of a single piece of hickory or other tough wood.

My object is to provide a forward end for the pole so constructed that if the pole proper is broken, a new forward end portion may be substituted readily, quickly and easily.

A further object is to provide means for splicing poles of the usual kind so that the curved rear end may be used, and only the straight forward portion of the pole need be substituted in case the forward end is broken, and further to provide means of this kind of simple, durable and inexpensive construction that may be quickly and easily applied in any ordinary blacksmith or wagon repair shop, and that will leave the repaired pole fully as strong or stronger than the original wooden pole.

My invention consists in the construction, arrangement and combination of the various parts of the device, whereby the objects contemplated are attained, as hereinafter more fully set forth, pointed out in my claims and illustrated in the accompanying drawings, in which—

Figure 1 shows a plan view of a vehicle pole embodying my invention. Fig. 2 shows an enlarged longitudinal sectional view of the rear end portion of the pole, and Fig. 3 shows an enlarged sectional view on the line 3—3 of Fig. 2.

Referring to the accompanying drawings, I have used the reference numeral 10 to indicate the pole hound, and 11 the braces secured to the ends of the pole hound and extended forwardly and inwardly. The pole proper comprises a body portion 12, of which only the rear end is shown in the drawings. It is of the class that is usually made of hickory or other tough wood, and its rear end is curved downwardly and rearwardly and attached to the pole hound. On top of the pole section 12 is a reinforcing strap 13 having a king bolt holder 14 at its forward end, and on the bottom of the pole section 12 is a reinforcing strap 15 which extends forwardly beyond the pole section 12. The forward end of the pole is formed of a sheet metal tube 16 tapered from its rear to its front end, and having inserted in it a wooden filler 17. The rear end of this filler is formed with a long bevel at 18, which lies wholly within the tube 16. The forward end of the pole section 12 is formed with a corresponding beveled portion to enter the tube 16.

In use, after the tube 16 is formed, I force the wooden filler 17 into it under pressure so as to completely fill the interior of the tube and prevent the tube from becoming indented or buckled. I then force the rear end of the tube over the forward end of the pole section 12 so that a strong and durable connection is made between the forward and rear pole sections. In order to firmly reinforce and brace the pole at the connection, there is a strap 15 extended forwardly beyond the joint and which is connected with the forward pole section by means of a bolt 19. The braces 11 are extended along the sides of the pole far enough to overlap the joint, and one bolt 20 is passed through the tube 16 and the pole section 12, and another bolt 21 through the tube 16 and the wooden filler 17. In this way, the pole is made stronger at the joint than at any other part throughout its length.

In practical use, it is my purpose to supply the trade with both the finished poles constructed as above described, as well as the tubes 16 having the wooden filler therein with its rear end beveled as shown. Then when a pole is broken at some point in front of the braces 11, the operator need only remove the braces 11, then cut the forward end of the pole section 12 on a bevel corresponding with the rear end of the wooden filler 17. He may then force the tube 16 over the beveled forward end of the pole section 12 and insert the bolts as described. In this way a pole may be made that is as strong or stronger than was the original pole, and the expense of the forward pole section and the labor required for placing it in position, is very slight as compared with the cost of a new wooden pole.

Having thus described my invention, what I claim and desire to secure by Letters Patent of the United States, therefor, is

In a device of the class described, the combination of a vehicle pole hound, a rear pole section fixed to the pole hound and extended forward, and upward, and having its forward end beveled, a forward pole section comprising a sheet metal tube tapered from its rear to its forward end, said sheet metal tube extending rearwardly from the beveled portion of the rear pole section, a wooden filler in the sheet metal tube having a tapered rear end designed to fit against the tapered forward end of the rear pole section, bolts passed through the said sheet metal tube and through both the forward and rear pole sections, a metal strap bolted to the rear pole section and extending under the forward pole section, a bolt passed through the forward pole section and through said strap, and two braces fixed to the pole hound and extended adjacent to the rear end of the forward pole section, the said bolts that pass through the forward and rear pole sections being also extended through said braces.

Des Moines, Iowa, July 25, 1907.

CHARLES W. NEEDLES.

Witnesses:
M. E. BENNETT,
A. G. HAGUE.